March 25, 1924.
A. G. FITZ GERALD
AIR CONTAINER
Filed April 11, 1921
1,488,004
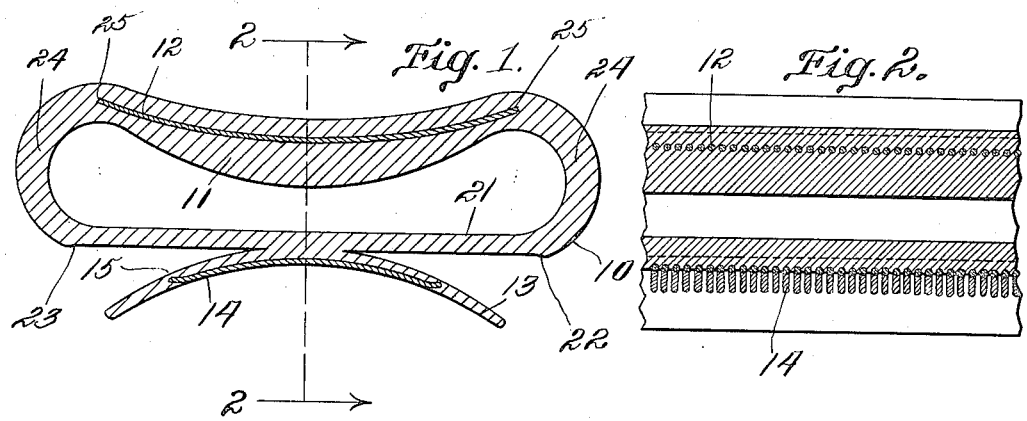
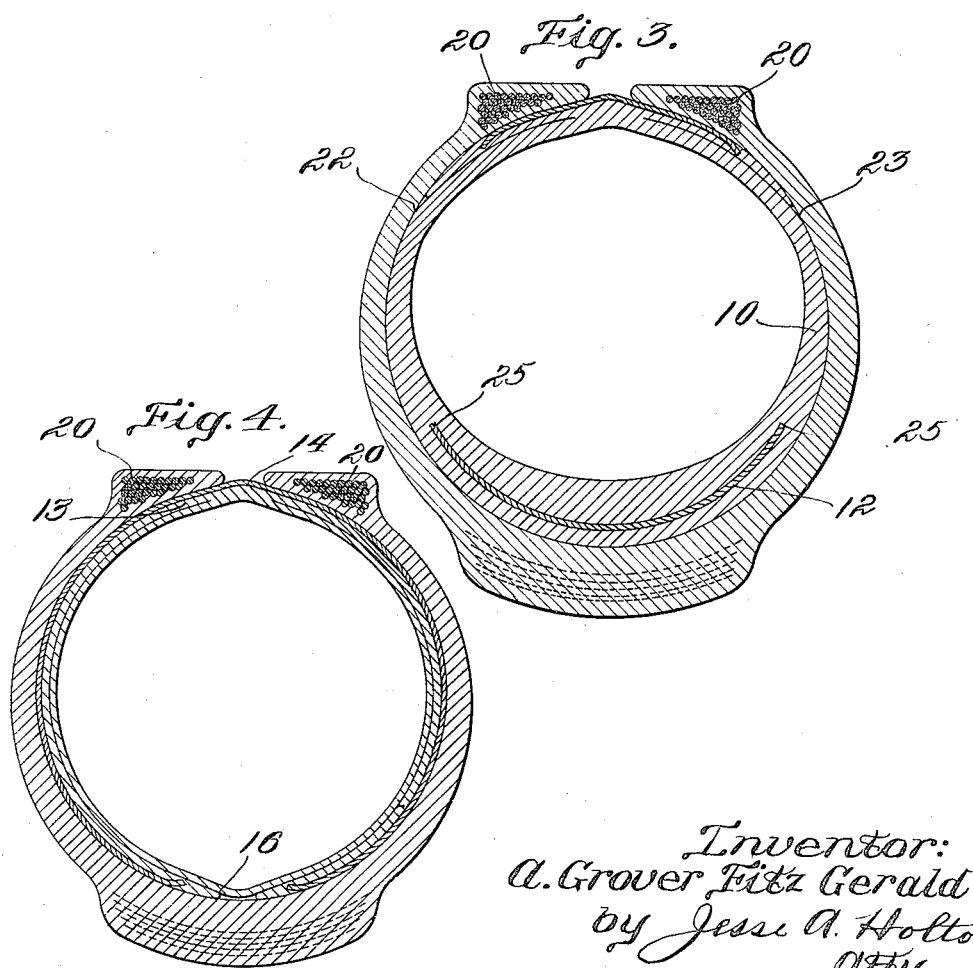
Inventor:
A. Grover Fitz Gerald
by Jesse A. Holton
Atty.

Patented Mar. 25, 1924.

1,488,004

UNITED STATES PATENT OFFICE.

ARTHUR GROVER FITZ GERALD, OF BROOKLINE, MASSACHUSETTS, ASSIGNOR TO IRA J. WEBSTER, OF HAVERHILL, MASSACHUSETTS.

AIR CONTAINER.

Application filed April 11, 1921. Serial No. 460,170.

*To all whom it may concern:*

Be it known that I, ARTHUR GROVER FITZ GERALD, a citizen of the United States, residing at Brookline, in the county of Norfolk and State of Massachusetts, have invented certain new and useful Improvements in Air Containers, of which the following is a full, clear, and exact description.

This invention relates to inner tubes for use in automobile tires and the like and with regard to certain more specific features thereof to a combined air container and protector.

One of the objects of the present invention is to provide an inner tube or container with a simply constructed inner circumferential protecting element whereby wear on the belly of the tube is prevented.

Another object of the invention lies in the construction of a tube with an attached reinforcing flap extended partially or wholly around the tube to minimize or obviate the possibility of the tube bursting under air pressure.

Still another object is to prevent the diastrous effects of chafing between the inner tube and the tire or shoe. The invention has special applicability to certain forms of puncture proof or puncture healing inner tubes wherein the tread portion is of greater thickness than the inner periphery or belly and the tendency to distortion is consequently greater at the inner periphery than at the tread.

Other objects will be in part obvious and in part particularly pointed out hereinafter.

The invention accordingly consists in the various features of construction, combination of elements and arrangements of parts which will be exemplified by the construction hereinafter set forth and the scope of the application of which will be indicated by the following claims.

In the accompanying drawings, wherein I show two of various possible embodiments of the invention:

Fig. 1 is a view in cross-section of an inner tube constructed in accordance with my invention.

Fig. 2 is a longitudinal section of Fig. 1, taken on the line 2—2 of Fig. 1.

Fig. 3 is a cross sectional view showing the inner tube of Fig. 1, assembled with an automobile tire, and Fig. 4 is a view corresponding to Fig. 3, but of a modified form of the invention.

Referring now more particularly to the drawings, there is indicated at 10 an inner tube or air container of puncture proof or puncture healing type. It is to be understood that the invention may be employed in connection with an inner tube of the ordinary or usual form but that it finds special application and is more particularly adapted to air containers having thickened tread portions and comparatively thin inner peripheries. The drawing shows an inner tube of the puncture healing type having a thickened tread portion 11 and threads, fiber, or fabric 12 extending through the thickened tread portion near the outer surface thereof to hold the mass of rubber in the tread portion distorted. As is well understood, tubes of this character are built upon mandrels with the fabric or threads applied prior to the mass of rubber which is intended to be held under compression or distortion. The tube is then turned inside out and the ends joined together by a vulcanizing process. In this way, what was formerly the inner diameter of the tube on the mandrel is caused to become the outer diameter of the tube, bringing about a compression of the mass of rubber in the tread portion which is held in its distorted or compressed form by the threads or fabric. The present invention contemplates a band or flap 13 made up in principal part of rubber or rubber composition which is attached to the inner periphery of the tube substantially along the centerline, and which may, if desired, be reinforced with fabric or threads 14 along the surface which is intended to come in contact with the shoe or tire near or opposite the beads of the tire. As shown herein, the flap is provided with a series of threads 14 spaced apart in about the same manner that the threads 12 of the tread portion of the tube are spaced, (see Fig. 2).

In the form of the invention shown in Figs. 1, 2, and 3, the flap 13 is attached around the inner periphery of the tube, substantially along the centerline thereof. This is done preferably by vulcanizing the flap and tube in the process of manufacturing the tube. In this form the flap extends but a short distance either side of the center-line, so as to lie between the tire and the main wall of the tube in the region of the tire beads 20. The threads 14 will contact with the inner surface of the tire opposite the beads, and any relative movement between the tube and the tire at or near the beads will be between surfaces of like material. For example, the threads 14 will be opposed to the fabric surface of the tire, and the rubber surface 15 of the flap will be opposed to the rubber in the belly of the inner tube.

In the modified form of the invention shown in Fig. 4, the flap 13 is carried on both sides around the body of the tube, as indicated at 16. The spaced apart surface threads 14 are used and extended nearly to the edge of the flap on each side as indicated. Here again there is the capability of relative movement between the three parts, that is, the tire, the tube proper and the flap. Where any relative movement takes place the opposed surfaces are of like material. Furthermore, in the form of the invention as carried out in Fig. 4, the possibility of the tube bursting upon the giving out of the tire or shoe is reduced to a minimum. Certain advantages of the invention are derived from the combination of the threads 14 or other fabric or fiber with the rubber flap 13, and certain advantages may be attributed to the use of a rubber flap in the form shown in Fig. 1 or Fig. 4 of the drawings, or some derivative thereof, without the inclusion of the threads or fabric.

Attention is directed to a reduced thickness of rubber 21, which characterizes the inner tube 10 between shoulders or points 22 and 23, and to the portion of rubber 24 which is comparatively thick which lies between the ends 25 of the threads or reinforcement on either side of the tread portion of the tube and the shoulders or points 22 and 23. An important advantage arises from this construction in that the stretch of the tube takes place principally through the portion of rubber of reduced thickness which lies between these shoulders along what has been termed herein the inner periphery of the tube. This relieves the strain at the ends of the reinforcing threads 12 and reduces to a minimum the possibility of separation between the ends of the threads and the rubber whereby their service in holding the rubber of the tread portion under compression might be impaired. It is to be understood, however, that the shoulders 22 and 23 are not necessarily included in the structure which provides various other advantages of the invention.

As many changes could be made in the above construction and as many apparently widely different embodiments of the invention might be made without departing from the scope thereof, it is intended that all matter contained in the foregoing description or shown in the accompanying drawings shall be interpreted as illustrative and not in a limiting sense.

What I claim is:

1. An air container comprising a rubber body of endless tubular form, and a rubber flap integrally attached thereto at its center and having free, unattached side edges.

2. An air container comprising a rubber body of endless tubular form with a flap extending from said body all along the centerline of its inner periphery and overlapping the body, said flap being of rubber with inserts of material having a higher wear resisting characteristic.

3. An air container comprising a rubber body of endless tubular form with a flap of rubber extending from and overhanging the body, said flap having threads on its surface which, when the air container is assembled with a tire casing will be opposed to the inner wall of the casing.

4. An air container of endless tubular form comprising a tread portion having a mass of rubber held under compression and reinforced by inserts of other material, a belly of unrestricted rubber, and a flap extending from the rubber partially around the tubular container to reinforce same while permitting a degree of relative movement between the flap and the belly of unrestricted rubber.

5. An air container of endless tubular form comprising a tread portion having a mass of rubber held under compression by inserts of other material, a belly of unrestricted rubber, and a flap extending from the rubber partially around the tubular container to reinforce same while permitting a degree of relative movement between the flap and the belly of unrestricted rubber, said flap being provided with surface threads in position to contact with the inner wall of a tire when in assembled position.

6. An inner tube for automobiles comprising in combination a thickened tread portion and side walls extending around to the inner periphery of the tube with an abrupt difference in thickness between the side walls and said inner periphery at their point of juncture, said tube being of rubber with reinforcing means such as threads embedded in the rubber of the tread portion and terminating some distance away from the thin portion of rubber constituting the inner periphery.

7. An inner tube for automobiles comprising in combination a thickened tread portion, side walls extending around to the inner periphery of the tube with a severe difference in thickness between the side walls and said inner periphery, said tube being of rubber with reinforcing means such as threads imbedded in the rubber of the tread portion and terminating some distance away from the thin portion of rubber constituting the inner periphery, and a reinforcing strip secured to the tube to lie in position adjacent the thin inner periphery.

8. An inner tube for automobiles comprising in combination a thickened tread portion, side walls extending around to the inner periphery of the tube with a severe difference in thickness between the side walls and said inner periphery, said tube being of rubber with reinforcing means such as threads imbedded in the rubber of the tread portion and terminating some distance away from the thin portion of rubber constituting the inner periphery, and a strip of rubber having one side integral with the tube, forming a flap to protect the inner periphery of the tube, said strip having wear resisting material exposed on one surface.

9. An inner tube for automobiles comprising, in combination, a thickened tread portion, an inner peripheral portion, side walls merging with the said tread portion and said inner peripheral portion, each of said side walls being thicker than the inner peripheral portion and merging with said peripheral portion to form a shoulder on the exterior of the tube, and a flap secured to the outer face of the inner peripheral portion, adapted to be received between the said shoulders.

10. An inner tube, comprising in combination, a thickened tread portion, side walls, an inner peripheral portion, and a flap secured to said inner peripheral portion, the thickness of the inner peripheral portion being such with relation to the thickness of the side walls as to provide a recess adapted to receive the flap.

11. An inner tube, comprising in combination, a thickened tread portion, side walls, an inner peripheral portion, and a flap secured to said inner peripheral portion, said inner peripheral portion being so arranged with relation to the side walls as to provide a recess adapted to receive the flap.

12. An air container comprising a rubber body of endless tubular form, a rubber flap integrally attached thereto at its center and having free, unattached, side edges, and inserts of material in the said flap having a higher wear resisting characteristic.

13. An air container comprising a rubber body of endless tubular form, a rubber flap integrally attached thereto at its center and having free, unattached side edges and inserts of material having a higher wear resisting characteristic inserted in the exposed or outer surface of the flap.

A. GROVER FITZ GERALD.